United States Patent [19]

Asai et al.

[11] 4,360,846

[45] Nov. 23, 1982

[54] OPERATING MODE CHANGE-OVER APPARATUS IN TAPE RECORDING AND/OR REPRODUCING APPARATUS

[75] Inventors: Toshio Asai; Toshiro Ohta, both of Tokyo; Kunio Shimizu, Funabashi; Tetsuji Nakazawa, Tokyo, all of Japan

[73] Assignee: Sony Corporation, Tokyo, Japan

[21] Appl. No.: 105,299

[22] Filed: Dec. 19, 1979

[30] Foreign Application Priority Data

Dec. 29, 1978 [JP] Japan .............................. 53-162459

[51] Int. Cl.[3] .............................................. G11B 15/10

[52] U.S. Cl. ....................................... 360/137; 360/62

[58] Field of Search ................. 360/62, 61, 96.3, 96.4, 360/137, 105; 242/200, 201

[56] References Cited

U.S. PATENT DOCUMENTS 4,223,362 9/1980 Kishi .................................... 360/61

*Primary Examiner*—Bernard Konick

*Assistant Examiner*—Alan Faber

*Attorney, Agent, or Firm*—Lewis H. Eslinger; Alvin Sinderbrand

[57] ABSTRACT

An operating mode change-over apparatus in a tape recorder includes: a plunger-solenoid having a stationary iron core and a movable iron core movable from a first position in contact with, and a second position spaced from, the stationary iron core; an electric motor; a pinion driven by the electric motor; a rack engageable with and disengageable from the pinion; an operating mode change-over member driven by the rack; a locking lever driven by the movable iron core and holding the engaged condition of the rack and pinion; and a spring for pressing the movable iron core to the stationary iron core, wherein, while the movable iron core is pressed to the stationary iron core, the plunger-solenoid is energized, and the electric motor is driven.

14 Claims, 17 Drawing Figures

14
15
16
7
25
24
10
2b
2a
17
21
9
31
1
3
k
63
22
10
10
88
12
67
j
j'
6
69
11a
68
11
66
65b
5
65
113
64
65a
4

25
72
71
76a
73
81
80
94
79a
89
88
6
77
93
75a
75
76
79
90
87
76b
86
90
84
85
91
78
92
83

SYSTEM CONTROL CKT
200
SW1
SW2
SW3
SW4
SW5
SW6
SW7
A
B
C
O1
O2
O3
O4
O5
24
25
27
28
SERVO CKT
202
M
14
FF DRIVE CKT
204
REW DRIVE CKT
206
M
15

OPERATING MODE CHANGE-OVER APPARATUS IN TAPE RECORDING AND/OR REPRODUCING APPARATUS

BACKGROUND OF THE INVENTION

1. Field of the Invention:

This invention relates to an operating mode change-over apparatus in a signal recording and/or reproducing apparatus, and more particularly to an operating mode change-over apparatus of the feather-touch push-button type using a plunger-solenoid.

2. Description of the Prior Art:

In a conventional tape recorder of the feature-touch push-button type, a plunger-solenoid is used as a mechanical trigger to change over various types of mode change-over mechanisms. In such arrangements a mechanically large load is applied to the plunger-solenoid. Thus, a large capacity power source is required for such plunger-solenoids. Typically, at least six to nine volts are required for an electric drive source. Accordingly, it is not feasible to drive such tape recorders of the feather-touch push-button types with a battery and such recorders are usually powered by standard a.c. power sources. In addition, heretofore tape recorders of the feature-touch push-button type have not been made in small sizes of the hand-held portable type since the plunger-solenoids employed heretofore have been relatively large. In fact, prior to the present invention no small size pocket feather-touch push-button types have been commercially sold.

SUMMARY OF THE INVENTION

Accordingly, it is an object of this invention to provide an operating mode change-over apparatus in a tape recording and/or reproducing apparatus which consumes very little electric power.

Another object of this invention is to provide an operating mode change-over apparatus in a tape recording and/or reproducing apparatus which can be readily operated by a battery power supply.

A further object of this invention is to provide an operating mode change-over apparatus of the feather-touch push-button type in a tape recording and/or reproducing apparatus which can be relatively small-sized and light in weight.

In accordance with an aspect of this invention, an operating mode change-over apparatus in tape recording and/or reproducing apparatus is provided with a plunger-solenoid having a stationary iron core and a movable iron core movable from a first position in contact with and a second position spaced from the stationary iron core. The tape recorder also includes an electric motor, a pinion driven by the electric motor and a rack engageable with and disengageable from the pinion. An operating mode change-over means is provided which is driven by the rack and locking means are provided driven by the movable iron core to hold the engaged condition of said rack and pinion. Spring means are provided for pressing the movable iron core against the stationary iron core so that while the movable iron core is pressed against the stationary iron core the plunger-solenoid is energized and the motor for driving the tape is driven.

Other objects, features and advantages of the present invention will be apparent from the following description taken in conjunction with the accompanying drawings.

DESCRIPTION OF THE PREFERRED EMBODIMENTS

One preferred embodiment of this invention, for example as can be used within a small-sized hand-held tape recorder for a micro-cassette, will be described with reference to the accompanying drawings.

The small hand-held tape recorder is of the feather-touch push-button type to change operating modes of the recorder and is powered by a battery contained in the recorder. With the mode change mechanism of the present invention the electric power consumed is minimal. The main reason for such little power consumption is that according to the present invention a movable iron core is attracted to a stationary core and an attracting force of several hundred grams is obtained by a current drain of only several milliamperes.

Figure 1:
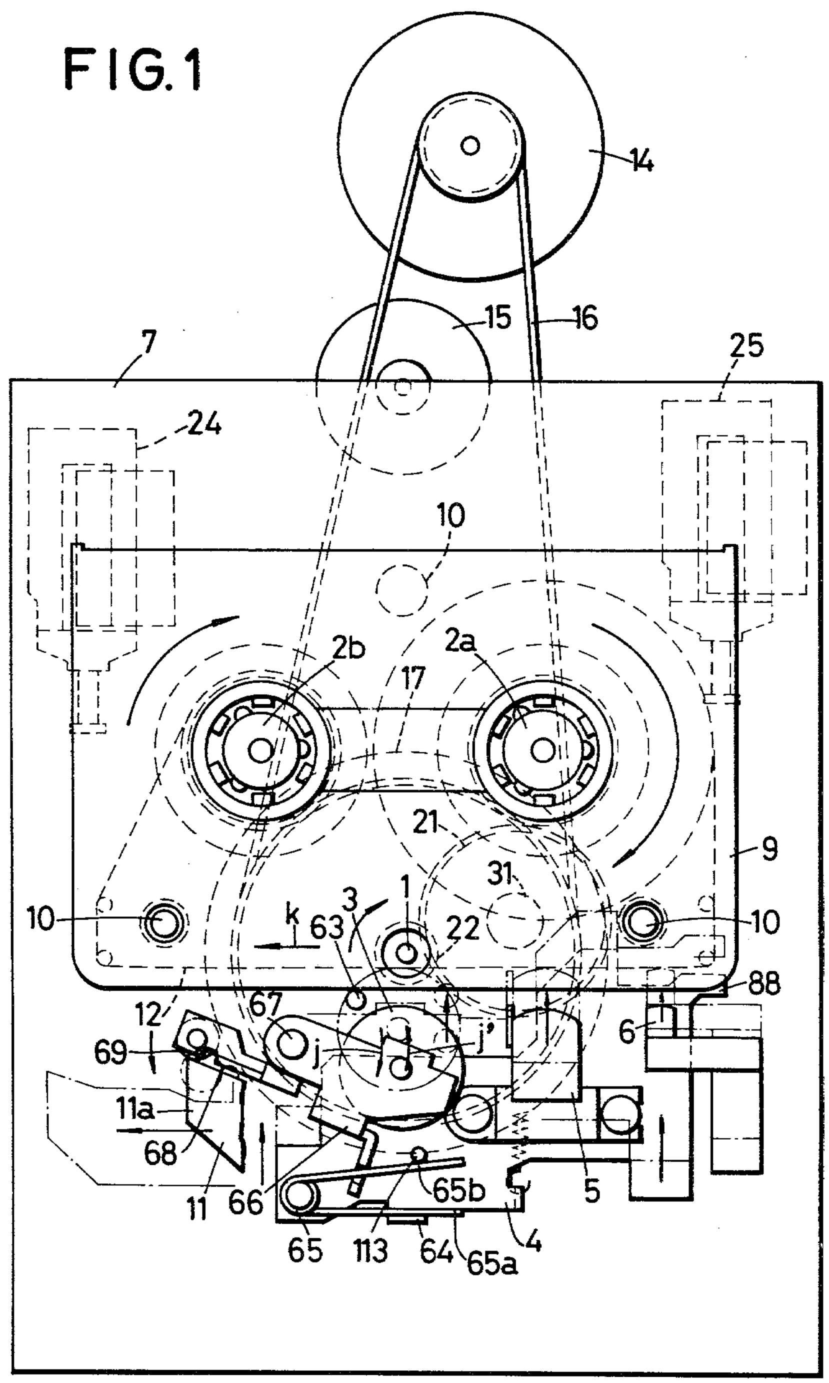
FIG. 1 is a plan view of the tape recorder according to a preferred embodiment of the present invention.
Figure 2:
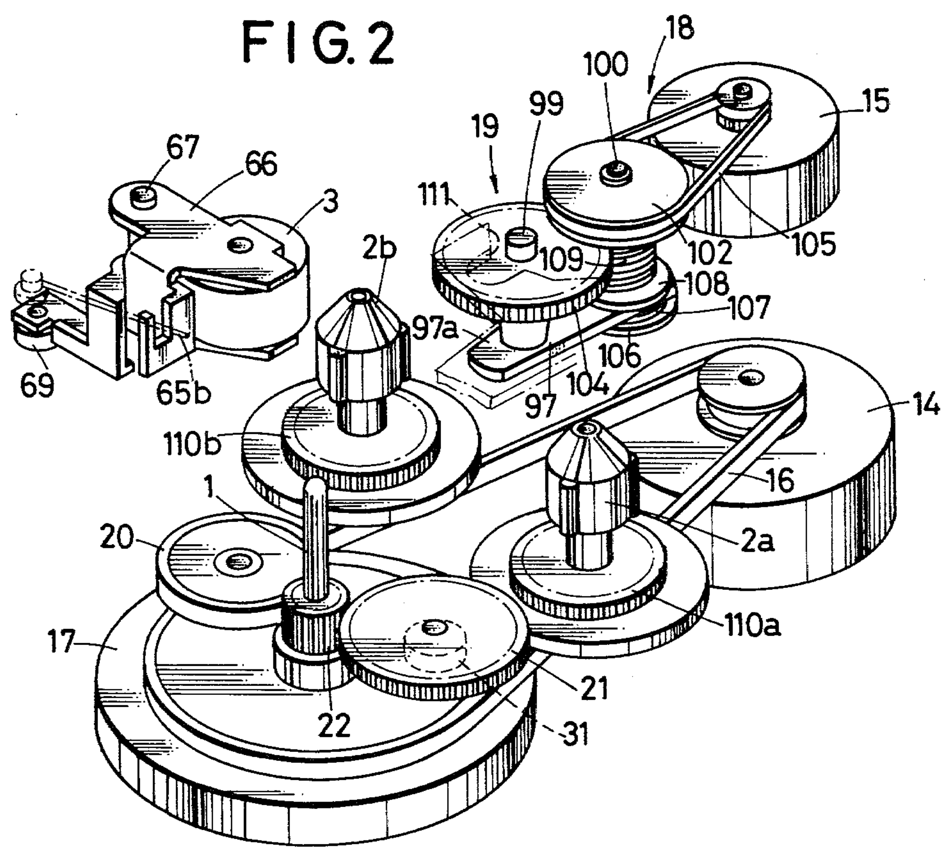
FIG. 2 is a perspective view of the drive portion of the recorder for driving the capstan and reel mounts of the tape recorder shown in FIG. 1.
Figure 3:
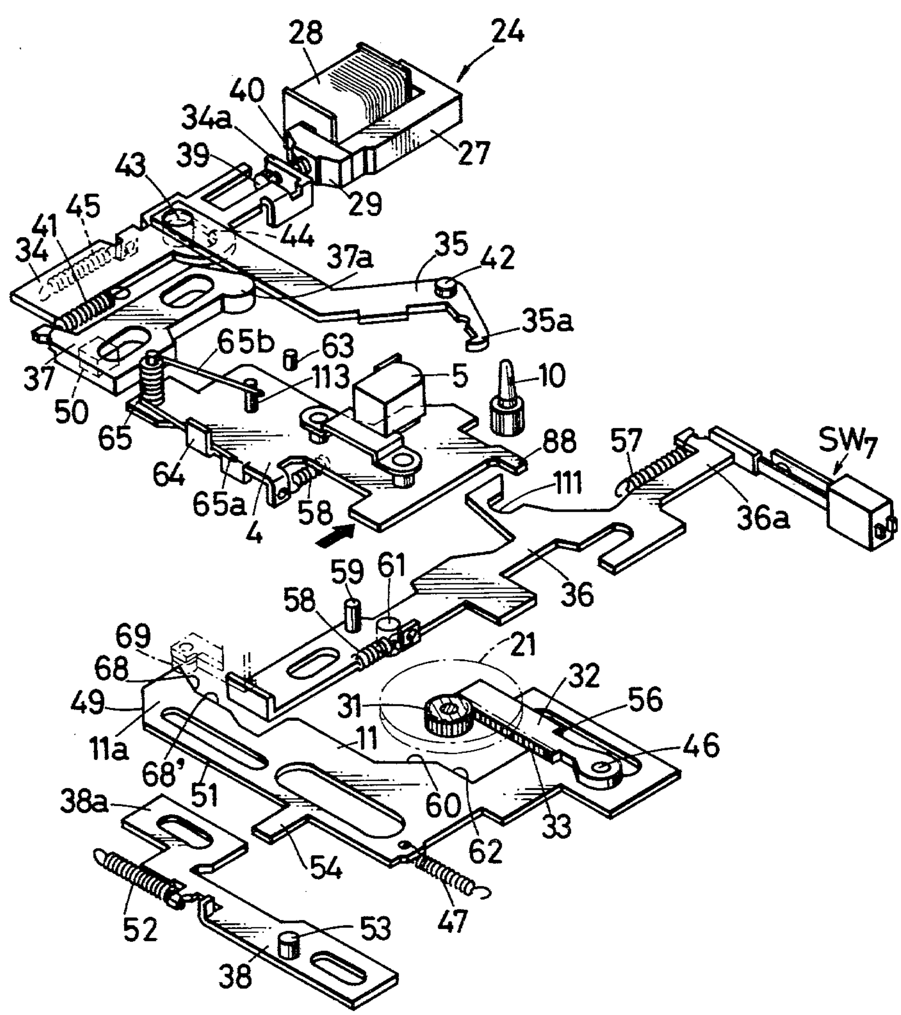
FIG. 3 is an exploded perspective view of a reproduction change-over mechanism in the tape recorder shown in FIG. 1.

Reference is first made to FIGS. 1 and 2 for a description of the small-sized tape recorder in which the mode change mechanism of the present invention is used. The recorder includes a drive capstan 1, a pair of reel mounts 2*a* and 2*b* for the tape cassette supply and take-up reels, a pinch roller 3, a head chassis assembly 4, a record/reproduce head 5 mounted on the chassis assembly 4 and an erase head 6 are all arranged on a deck support 7. In use a tape cassette 9 is positioned in the recorder by three positioning pins 10 which are accommodated in suitable receiving holes in the cassette. The head chassis assembly 4 is moved forward from its first retracted position (shown by the solid line in FIG. 1) to its second operative position (shown by the chain line) with the sliding forward movement of a setup slide 11 to be described hereinafter. The forward movement of the setup slide 11 also moves pinch roller 3, record/reproduce head 5 and erase head 6 inserted into operative position within cassette 9 so that record/reproduce head 5 and erase head 6 contact magnetic tape 12 within cassette 9 and presses pinch roller 3 against capstan 1 with tape 12 therebetween.

The tape recorder is also provided with a first drive motor 14 for recording and reproducing operations, and a second drive motor 15 for fast-forward and rewind operations. Motor 14 drives capstan 1 through a capstan fly wheel 17 and a belt 16 about its output shaft. Motor 15 drives a fast-forward/rewind change-over idler 19 through an idler drive mechanism 18. Take-up reel mount 2*a* is driven through an idler 20 driven by capstan 1 and a main gear 21 is provided which is also driven by capstan 1 through a capstan gear 22 coaxially fixed on the capstan. The tape recorder also includes a first plunger-solenoid 24 used during the reproduce change-over operation and a second plunger-solenoid 25 used during the record change-over operation.

Reference is now made to FIGS. 3 to 8 for a description of the mechanism for changing into the reproduction or play mode. For this operation plunger-solenoid 24 is used and this plunger-solenoid comprises a substantially U-shaped stationary iron core 27 made of a magnetic material, a coil 28 wound on one arm of the U-shaped stationary iron core 27 and a movable iron core 29 made of magnetic material. When current is supplied to the coil 28 the movable iron core 29 retracts to move into contact with the stationary iron core 27. When coil 28 is deenergized, the movable iron core 29 is designed so as to be separable from and to move away from stationary iron core 27.

The drive source for the reproduce change-over mechanism is main gear 21 driven by capstan 1. A pinion 31 coaxially fixed on main gear 21 engages a rack 33 formed in an edge of a setup lever 32 which is rotatably fixed to setup slide 11 by a pin 46. When so engaged setup lever 32 is driven by main gear 21 to move the setup slide 11 to its set position. At that time, the engagement of pinion 31 with rack 33 is maintained through a reproducing slide 34 and a lock lever 35 with energization of plunger-solenoid 24. The head chassis assembly 4 is moved forward through a head chassis slide 36 by movement of setup slide 11. An urging slide 37 is also provided for pressing movable iron core 29 against stationary iron core 27, and the urging slide is controlled by setup slide 11 and a timing slide 38. Movable iron core 29 is slidably supported by a support pin 39 extending from its end engaged within a bent end 34*a* of reproduction slide 34 and is urged against stationary iron core 27 by a coil spring 40 extending between bent end 34*a* and movable iron core 29.

Figure 4:
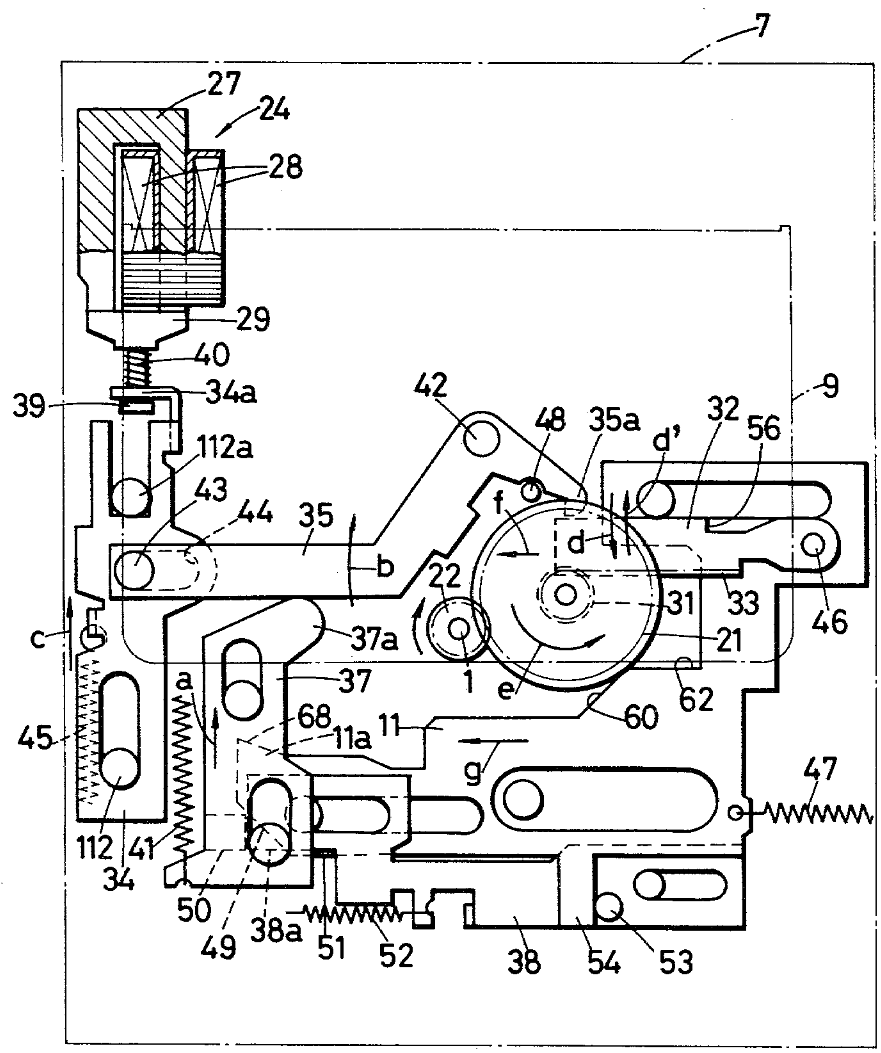
FIGS. 4 to 8 are plan views illustrating operations of the reproduction change-over apparatus shown in FIG. 3.

Reference is now made to FIG. 4 which shows the arrangement of the mode change mechanism in the stop mode of the tape recorder. In FIG. 4, it is seen that urging slide 37 is urged upwardly, as viewed, in the direction shown by arrow a by a spring 41 so that an upper rounded extending portion 37*a* of slide 37 contacts lock lever 35 to urge lock lever 35 to pivot about its support pin 42 in the direction indicated by arrow b until lock lever 35 bears against a stop pin 48. Lock lever 35 is also engaged with urging slide 37 by a roller member 43 mounted on urging slide 37 which is engaged within an oblong opening 44 in lock lever 35. Because of this interconnection of lock lever 35 and urging slide 37, this rotation of lock lever 35 urges the urging slide upwardly in the direction indicated by the arrow c against the urging force of spring 45, which is less than the force of spring 41, connected between urging slide 37 and deck 7. Slide 37 is disposed for sliding movement on deck 7 on stop ins 112 and 112*a* extending therefrom which are disposed in suitable receiving slots. As a result, movable iron core 29 is urged and maintained against stationary iron core 27 by spring 40. In the position shown in FIG. 4, the other end 35*a* of lock lever 35 bears against and pushes setup lever 32 downwardly in the direction indicated by arrow d about its support pin 46. As a result, rack portion 33 of setup lever 32 moves into engagement with pinion 31.

With the recorder in the above described stop mode, when a reproduce push button of the feather-touch type (not shown) is depressed, the coil 28 of the plunger-solenoid 24 and drive motor 14 are energized.

With the energization of coil 28, movable iron core 29, which is urged against stationary iron core 27, is fixed on stationary iron core 27 by the electro-magnetic force generated from the energized stationary iron core 27. Since movable iron core 29 is already pressed against stationary iron core 27 without spacing therebetween, movable iron core 29 can be fixed on stationary iron core 27 by a very small electro-magnetic force which requires very little current, for example, only several milliamperes. While movable iron core 29 is fixed on stationary iron core 27, the engaged condition of pinion 31 and rack 33 is maintained by reproducing slide 34 and lock lever 35.

With the energization of motor 14 capstan fly wheel 17 is rotated and main gear 21 is rotated through capstan gear 22 in the direction shown by arrow e. Rotation of main gear 21 drives rack 33 through engaged pinion 31 so that setup lever 32 is pulled in the direction shown by the arrow f. This movement of setup lever 32 also moves slide 11 which is coupled to setup lever 32 in the direction shown by the arrow g against the force of a spring 47 connected between slide 11 and deck 7.

When rack 33 is driven by the pinion 31, a rotational moment in the direction shown by the arrow d' is imparted to setup lever 32. However, since setup lever 32 is urged in the opposite direction by the engagement of end 35*a* of lock lever 35, rack 33 is mounted in engagement with pinion 31. It is evident that if rack 33 is not urged against pinion 31 by end 35*a* of lock lever 35, rack 33 would be disengaged from the pinion due to the rotational moment which is generated during the drive of rack 33.

Figure 5:
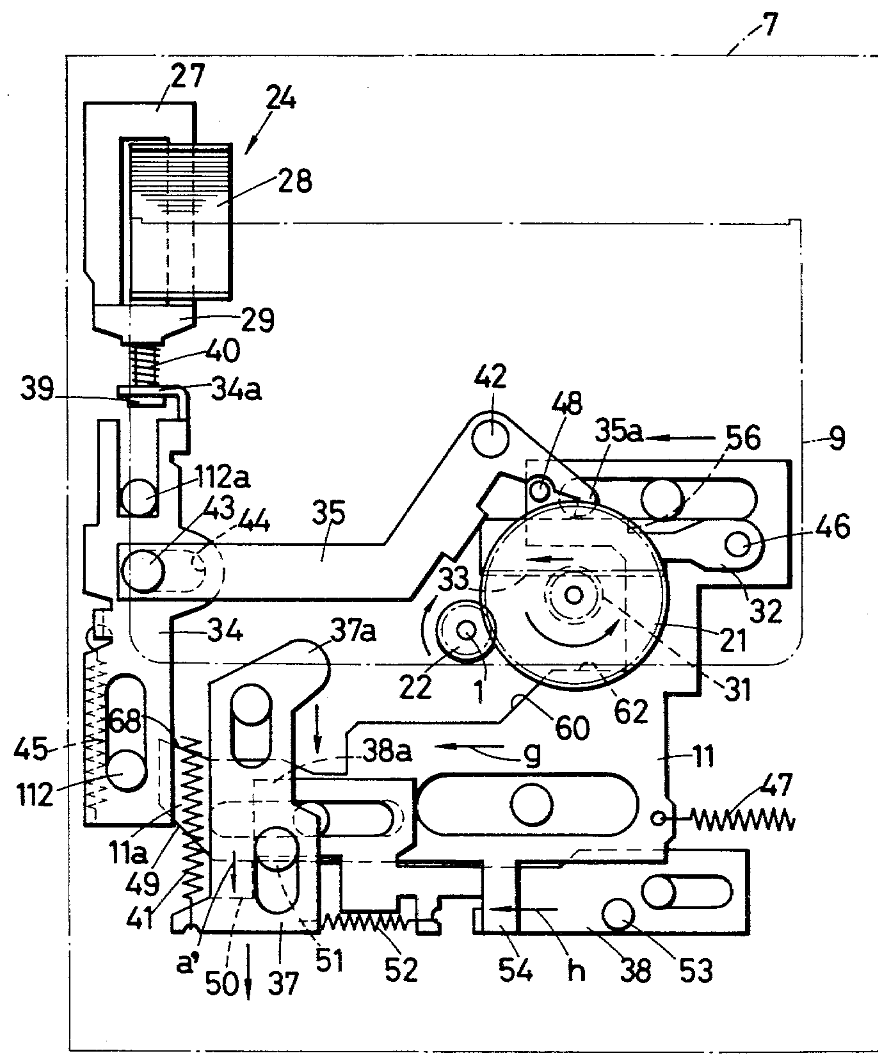

When the setup slide 11 is moved in the direction shown by arrow g, a projection 50 formed on urging slide 37 is engaged by a slanted cam surface 49 formed on an upper end 11*a* of setup slide 11. Projection 50 is guided by the slanted cam surface 49 so that urging slide 37 is moved back in the direction shown by the arrow a' (see FIG. 5 as well) against the force of spring 41. When urging slide 37 has been moved to its rearward position, as shown in FIG. 5, projection 50 rides on a rear edge 51 of setup slide 11 to lock urging slide 37 in the rearward position.

With the rearward movement of urging slide 37 the upper end 37*a* of urging slide 37 is separated from lock lever 35 and, thus, the engaged condition of pinion 31 and rack 33 is maintained only by the electro-magnetic retention force of plunger-solenoid 24.

Figure 6:
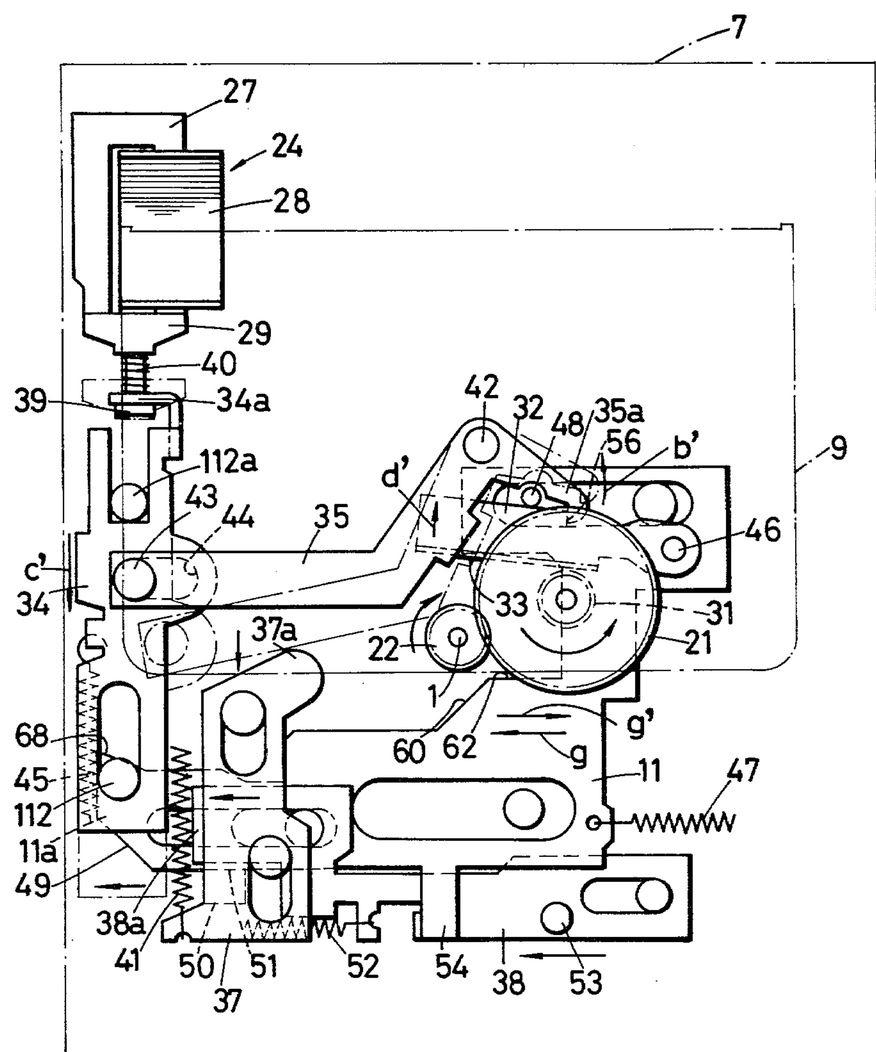

At the same time, movement of setup slide 11 moves timing slide 38 in the direction shown by arrow h by a spring 52 connected between timing slide 38 and deck 7. Prior to movement of setup slide 11 a pin 53 extending from timing slide 38 is pressed against a rearward facing projection 54 formed on the lower edge of setup slide 11. Thus after movement of setup slide 11, timing slide 38 is pulled in the direction shown by the arrow h at the same time as setup slide 11 is moved in the direction shown by arrow g. Since in the first state of movement of setup slide 11, an upper end 38*a* of timing slide 38 is in contact with projection 50 of urging slide 37, timing slide 38 is initially prevented from moving in the direction shown by arrow h. However, when urging slide 37 has been moved to the position shown in FIG. 5, upper end 38*a* of timing slide 38 is disengaged from projection 50 of urging slide 37. At that instant, timing slide 38 is moved in the direction shown by arrow h by spring 52 and, as shown in FIG. 6, upper end 38*a* of timing slide 38 contacts the front of projection 50 of urging slide 37. Thus, urging slide 37 is prevented from moving in the direction shown by arrow a by timing slide 38.

When setup slide 11 has been moved to the set position, as shown in FIG. 6, a cutout 56 formed in the top surface of setup lever 32 moves into register with top end 35*a* of lock lever 35. At that time, setup lever 32 is no longer restrained in its down position by lock lever 35 and is rotated in the direction indicated by arrow d' by the rotational moment to then again engage top end 35*a* of the lock lever 35 within cutout 56 of setup lever 32 at a more elevated position. In this position, setup lever 32 is locked and constrained from further movement by lock lever 35. This upward movement of setup lever 32 also disengages rack 33 from pinion 31.

Figure 7:
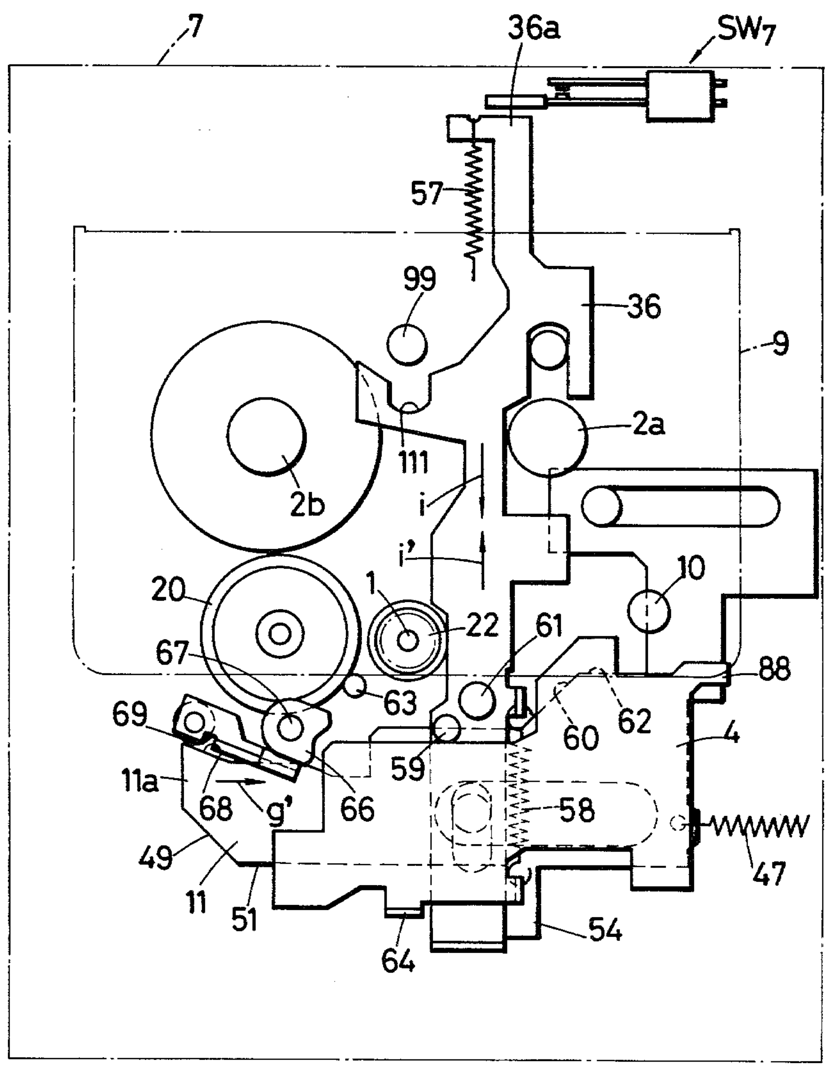

Reference is now made to FIG. 7 where it is shown that before setup slide 11 is moved in the direction shown by arrow g the head chassis slide plate 36 is urged in the direction shown by arrow i by a spring 57 fixed between an end of head chassis slide plate 36 and deck 7. With head chassis slide plate 36 in this position head chassis assembly 4 and head 5 are located at their original retracted positions. Head chassis assembly 4 is urged in the direction shown by arrow i' by a spring 58 extended between head chassis assembly 4 and head chassis slide plate 36 so that the forward edge of the head chassis assembly 4 contacts a pin 59 extending from head chassis slide plate 36.

When setup slide 11 is moved in the direction as indicated by arrow g, as above described, a roller 61 supported on head chassis slide plate 36 is contacted and pushed by a slanted cam surface 60 formed on an intermediate portion of setup slide 11. Roller 61 is guided by slanted cam surface 60 so that the head chassis slide 36 is moved upwardly, as viewed in FIG. 7, in the direction indicated by arrow i' against the urging force of spring 57. With the movement of head chassis slide plate 36 head chassis assembly 4 is also moved in the direction indicated by arrow i' under the urging of spring 58 interconnecting head chassis plate 36 and head chassis assembly 4. Thus, head chassis assembly 4 is located at its operative position shown in broken line in FIG. 1.

When the setup slide 11 moves to its set position (shown in FIG. 8) roller 61 rides up slanted cam surface 60 onto a stepped ledge 62 of setup slide 11 to lock head chassis slide plate 36 in its set position at the same time head chassis assembly 4 moves upwardly to its set position until it contacts a stop pin 63 and one of the positioning pins 10 to be positioned in its operative position.

As illustrated in FIG. 1, when head chassis assembly 4 moves forward one end 65*a* of a pinch roller pressing spring 65 is contacted and pushed by a projection 64 formed on the rear edge of head chassis assembly 4 and a pinch roller lever 66, within which pinch roller 3 is rotatably mounted, is pushed by the other end 65*b* of pinch roller pressing spring 65. Pinch roller lever 66 is pivotally mounted on a support pin 67 and rotates about pin 67 under the urging of spring 65 until restrained from further rotation by a pin 113 fixed on head chassis assembly 4.

With the forward movement of the head chassis assembly 4, pinch roller lever 66 is rotated in the direction of arrow j' about support pin 67 and pinch roller 3 is pivoted into contacting engagement with capstan 1 disposed within cassette 9. At the same time, the record-/reproduce head 5 is inserted into cassette 9 to contact magnetic tape 12 therein. However, in this operating mode erasing head 6 is not moved forward with the movement of the head chassis assembly 4.

A cam (not shown) is formed in setup slide 11 and a lever (not shown) is provided to support idler 20. As setup slide 11 moves the cam engages the idler lever to press the idler 20 between capstan fly wheel 17 and take-up reel mount 2*b*.

In this manner the tape recorder is changed from the stop mode over into the reproduce mode. Magnetic tape 12 in cassette 9 runs at a constant speed in the direction shown by arrow k in FIG. 1, to reproduce signals recorded on magnetic tape 12.

To change from the reproduce mode, for example when a stop push button is depressed, coil 28 and motor 14 are deenergized. With the deenergization of coil 28 slide 34 is moved back in the direction of arrow c' by spring 45, as shown in broken line in FIG. 6, and, therefore, movable iron core 29 is separated from stationary iron core 27. With this movement of slide 34 lock lever 35 is rotated about its pivot 42 in the direction of arrow b' and end 35*a* of lock lever 35 is disengaged from cutout 56 of setup lever 32 to release setup lever 32 from its locked position. With the release of this lock setup slide 11 moves back to its original position, shown in FIG. 4, under the urging of spring 47.

With the return movement of setup slide 11 projection 50 on urging slide 37 moves from its contact with edge 51 of setup slide 11 onto the upper end 38*a* of timing slide 38. Just before setup slide 11 reaches its original position, as shown in FIG. 4, projection 54 comes into contact with pin 53 and timing slide 38 is moved back to its original position, as shown in FIG. 4, under the urging of spring 52. As a result, upper end 38*a* of timing slide 38 is disengaged from projection 50 on urging slide 37. At that instant urging slide 37 is moved forward to its operative position, in the direction of arrow a as shown in FIG. 4, under the urging of spring 41. Lock lever 35 in turn is contacted by the upper end 37*a* of urging slide 37 and is rotated in the direction indicated by arrow b. With this rotation of lock lever 35 reproducing slide 34 is again moved forward, against the urging of spring 45, to press movable iron core 29 to stationary iron core 27. Concurrently, setup lever 32 is contacted by the upper end 35*a* of lock lever 35 to once again rotate in the direction indicated by arrow d and to engage rack 33 with pinion 31.

When setup slide 11 is moved back, head chassis slide plate 36 is also pulled back to its original position shown in FIG. 7 in the direction indicated by arrow i under the urging of spring 57. At that time, head chassis assembly 4 is pushed by pin 59 fixed on head chassis slide plate 36 and is returned to its original position as shown in FIG. 7. In addition, pinch roller lever 66 is pivoted by pinch roller pressing spring 65 in the direction indicated by arrow j by pin 113 fixed on the head chassis assembly 4 to retract pinch roller 3 from engagement with capstan 1. Idler 20 is also separated from engagement with capstan flywheel 17 and take-up reel mount 2*b* with the rearward movement of setup slide 11. Thus, the tape recorder is changed over into the stop mode from the reproduce mode.

Reference is now made to FIGS. 9 to 12 for a description of the record mode changeover mechanism. In this operation the second plunger-solenoid 25 is used and this solenoid includes a stationary iron core 71, a coil 72 and a movable iron core 73 which are the same as are present in plunger-solenoid 24 and plunger-solenoid 25 and function in the same manner.

The recorder includes a record/reproduce switch 75 which is preferably a slide switch and is arranged in the record change-over mechanism. In the stop mode of the recorder record/reproduce switch 75 is positioned in the record position. When the tape recorder is changed over into the record mode record/reproduce switch 75 is held in the record position since the electro-magnetic holding force from plunger-solenoid 25 is transmitted through a record holding slide 76 to a record/reproduce change-over slide 77 which cooperatively engages switch 75. When the tape recorder is changed over into the reproduce mode as described above, record/reproduce switch 75 is moved to the reproduce position through the record/reproduce slide 77 by a record/reproduce change-over lever 78 which is operated in conjunction with the forward movement of the head chassis assembly 4. Erase head 6, which is of the magnetic type, is fixed on an erase head slide 79. When the tape recorder is changed over into the record move, erase head 6 on erase head slide 79 is moved forward into cassette 9 in contact with tape 12. Movable iron core 73 is slidably supported by a support pin 80 on a part 76*a* of record holding slide 76 and is urged against stationary iron core 71 by a spring 81 in the same manner as described above with reference to plunger-solenoid 24.

Figure 10:
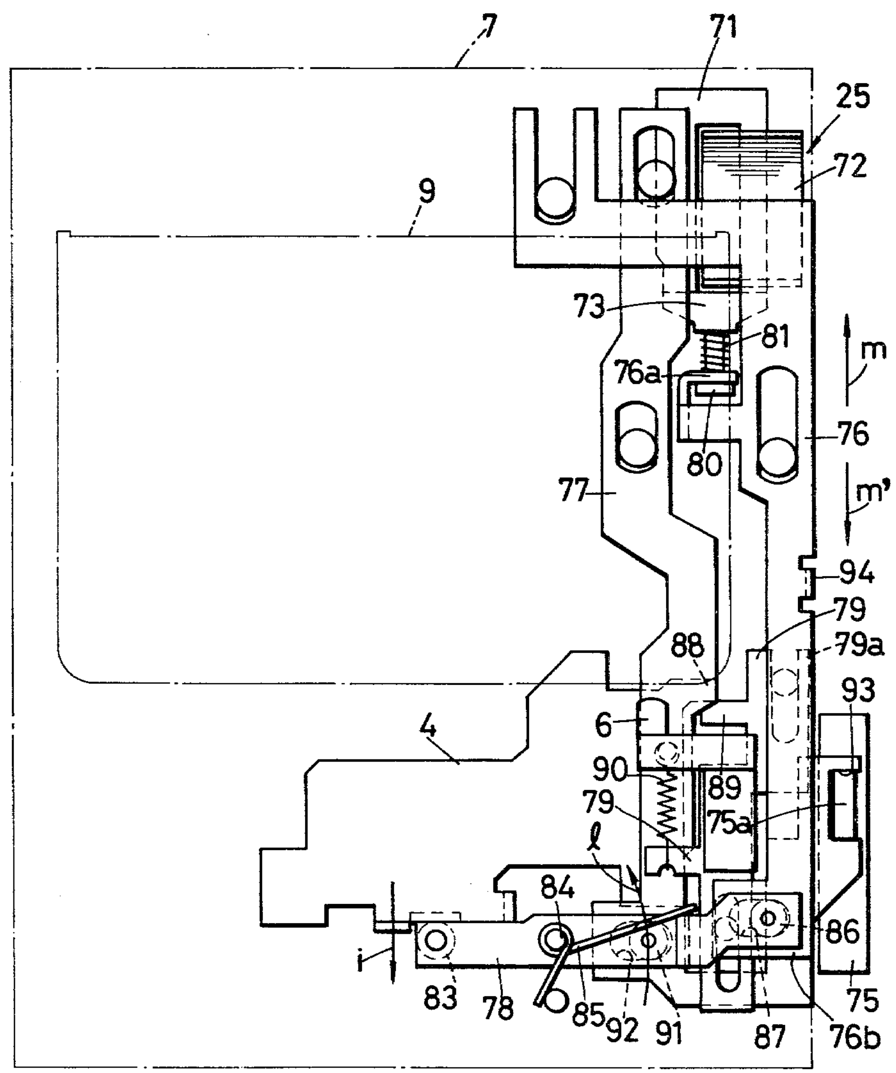
FIGS. 10 to 12 are plan views illustrating operations of the record change-over apparatus shown in FIG. 9.

In the change-over operation from the stop mode, shown in FIG. 10, to the record mode, such as may be initiated by depressing a feather-touch record push button, initially head chassis assembly 4 contacts a roller 83 supported on one end of record/reproduce change-over lever 78 and urges lever 78 in the direction indicated by arrow i in FIG. 10. Accordingly, the record-/reproduce change-over lever 78 is urged about its pivot support pin 84 against a torsion spring 85, in the direction indicated by arrow 1, so as to push record holding slide 76 at its end 76*b* through a roller 86 on lever 78 engaged within an oblong opening 87 in end 76*b* in the direction indicated by arrow m. As a result movable iron core 75 is pressed against stationary iron core 71 by spring 81.

A lateral projection 89 formed in an end portion 79*a* of erase head slide 79 is pushed against a spring 90, in the direction indicated by arrow m', by a lateral projection 88 formed on one corner of head chassis assembly 4. Another roller 91 is provided on record/reproduce change-over lever 78 between support pin 84 or roller 86. Roller 91 is engaged within oblong opening 92 formed in a rear end portion of record/reproduce change-over slide 77. Accordingly, record/reproduce change-over slide 77 is urged by roller 91 in the direction indicated by arrow m. A rectangular cutout 93 is formed in an end portion of record/reproduce change-over slide 77 to engage an actuator 75*a* of record/reproduce change-over switch 75. Thus as slide 77 is positioned in the record mode the record/reproduce change-over switch 74 is also positioned in the record mode.

Figure 11:
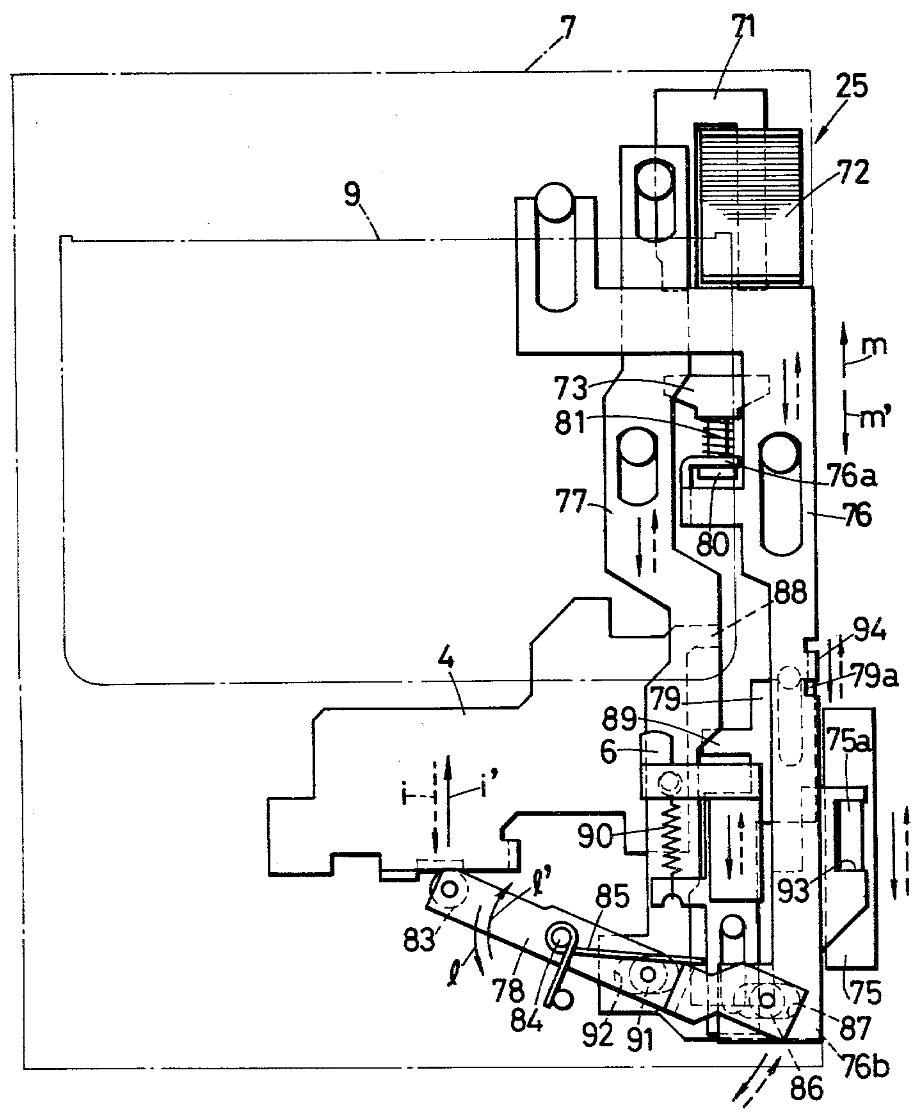

When the tape recorder is changed over into the reproduce mode from the stop mode head chassis assembly 4 moves forward to the operative position shown in FIG. 11 in the direction indicated by arrow i' and record reproduce change-over lever 78 rotates in the direction indicated by arrow l' in response to the spring action of torsion spring 85. This movement moves record holding slide 76 and record/reproduce change-over slide 77 in the direction indicated by arrow m'. Accordingly, actuator 75*a* of record/reproduce switch 75 is rapidly changed over to the reproduce mode.

The distance between support pin 84 and roller 91 on record/reproduce change-over lever 78 is relatively small. Accordingly, it is seen that on the basis of the mechanical advantage obtained by a lever record/reproduce change-over slide 77 is pushed by a relatively large force in the direction indicated by arrow m'. Therefore, actuator 75*a* of record/reproduce switch 75 is securely and positively changed over to a reproduce mode. At the same time a projection 94 formed in the middle portion of record holding slide 76 moves into contact with upper end 79*a* of erase head slide 79 to rapidly push slide 79 back in the direction indicated by arrow m' against the urging force of spring 90. Thus, erase head 6 is precluded from insertion into cassette 9.

When the tape recorder is again changed over into the stop mode head chassis assembly 4 is moved back in the direction indicated by arrow i to rotate record/reproduce change-over lever 78 in the direction indicated by arrow l and thereby to move record holding slide 76 and record/reproduce change-over slide 77 in the direction indicated by arrow m. Accordingly, record/reproduce switch 75 is again changed over to its record mode and movable iron core 73 is again pressed against stationary iron core 71.

Figure 12:
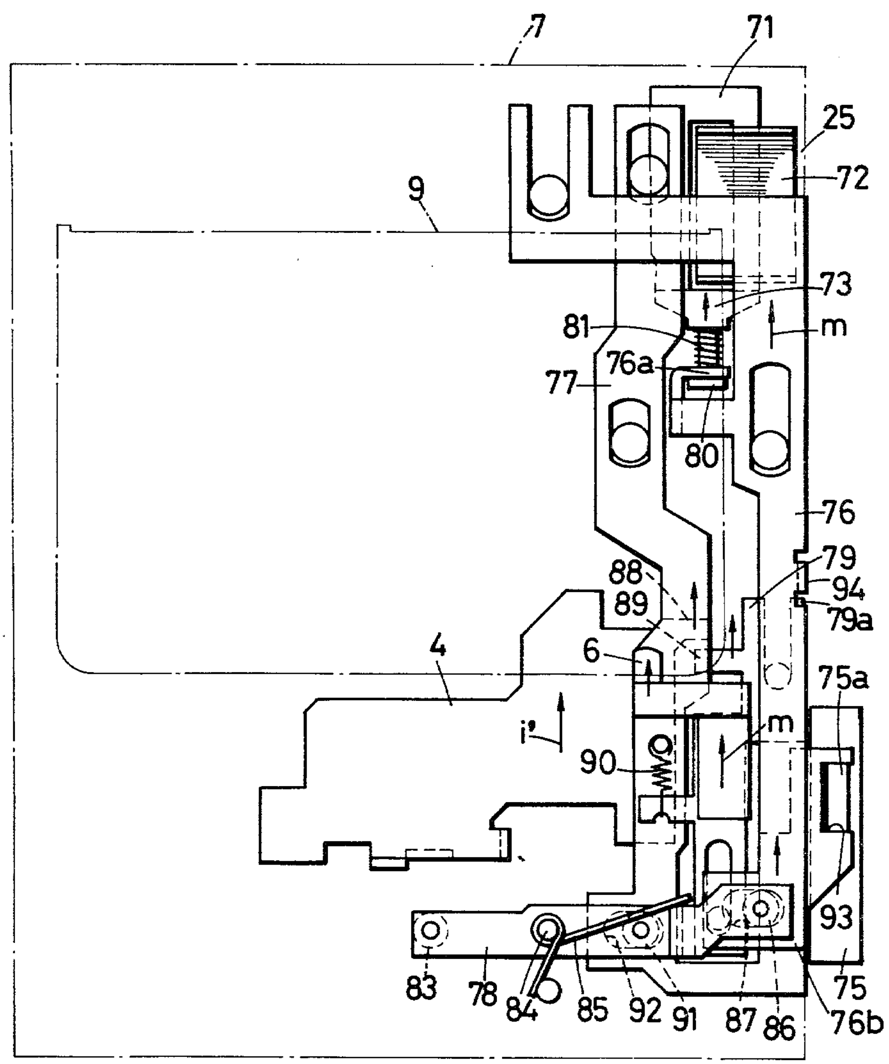

To initiate the record mode, a record push-button (not shown) is depressed. The tape recorder is changed over into the reproduce mode as described above while coil 72 of plunger-solenoid 25 is energized. With the energization of coil 72 movable iron core 71 in contact with stationary iron core 71 is held in contact by electromagnetic force. As shown in FIG. 12, record holding slide 76 is held in position and record/reproduce slide 77 is held through record/reproduce change-over lever 78 by record holding slide 76. Thus, the record-/reproduce switch 75 is held in its record mode. When lateral projection 88 of head chassis assembly 4 is moved in the direction of arrow i', projection 89 on erase head slide 79 is moved in the direction indicated by arrow m under the urging of spring 90. Thus, erase head 6 comes into contact with magnetic tape 12 within cassette 9.

As above described, the small-size tape recorder is changed over into the record mode for recording desired signals. When the tape recorder is again changed over into the stop mode, head chassis assembly 4 is moved back in the direction indicated by arrow i and erase head slide 79 is pushed back in the direction indicated by arrow m' to withdraw erase head 6 from cassette 9.

Reference is now made to FIGS. 13 to 16 for a description of the fast-forward/rewind change-over mechanism. For fast forward/rewind bi-directional electric motor 15 is controlled so as to rotated in either direction. Idler 19 is moved into driving relation with either the take-up or supply reel hubs depending on the direction of rotation of motor 15.

Idler 19 is rotatably supported on an idler shaft 98 which is fixed on one end 97a of a swing plate 97 and a roller 99 is mounted on the upper end of idler shaft 98. A shaft 100 is provided fixed to deck 7 and a sleeve 101 is rotatably disposed about shaft 100. An intermediate pulley 102 having a drive gear 103 fixed on its lower surface is fixed on the upper end of sleeve 101. Gear 103 is engaged with a gear 104 formed on the periphery of idler 19. Intermediate pulley 102 is driven through a belt 105 by electric motor 15.

The other end 97b of swing plate 97 is fitted to sleeve 101 beneath intermediate pulley 102 so that swing plate 97 swings with sleeve 101. Sleeve 101 at its lower end is provided with a flange 106 and end 97b of swing plate 97 is frictionally locked on flange 106 of sleeve 101 by a pair of friction discs 107 and 108 sandwiched about end 97b of swing plate 97. Discs 107 and 108 are urged to grip end 97b by a coiled spring 109 disposed about sleeve 101. Thus spring 109 presses against disc 108 which bears against end 97b which rests on disc 107 sitting on flange 106.

Figure 15:
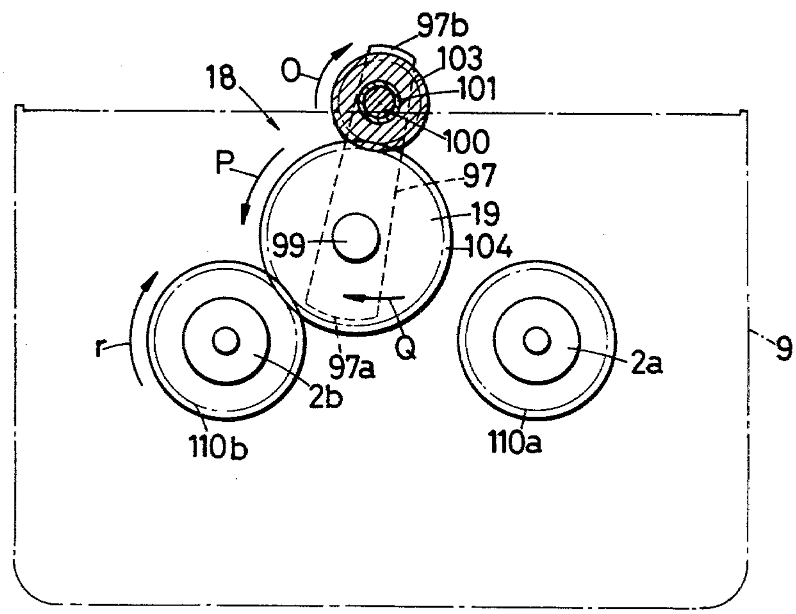
FIGS. 15 and 16 are plan views illustrating operations of the fast-forwarding/rewind change-over mechanism shown in FIG. 13.

When the recorder is placed into the fast-forward mode, electric motor 15 is rotated in the forward direction. As shown in FIG. 15, drive gear 103 is driven in the direction indicated by arrow o, and idler 19 is rotated in the direction indicated by arrow p. At this time swing plate 98 swings in the direction indicated by arrow q due to the frictional torque of frictional discs 107, 108 and idler 19 engages with gear 110b formed on the periphery of take-up reel mount 2b. As a result take-up reel mount 2b rotates at a high speed in the direction indicated by arrow r to transport magnetic tape 12 in a forward direction at high speed.

Figure 16:
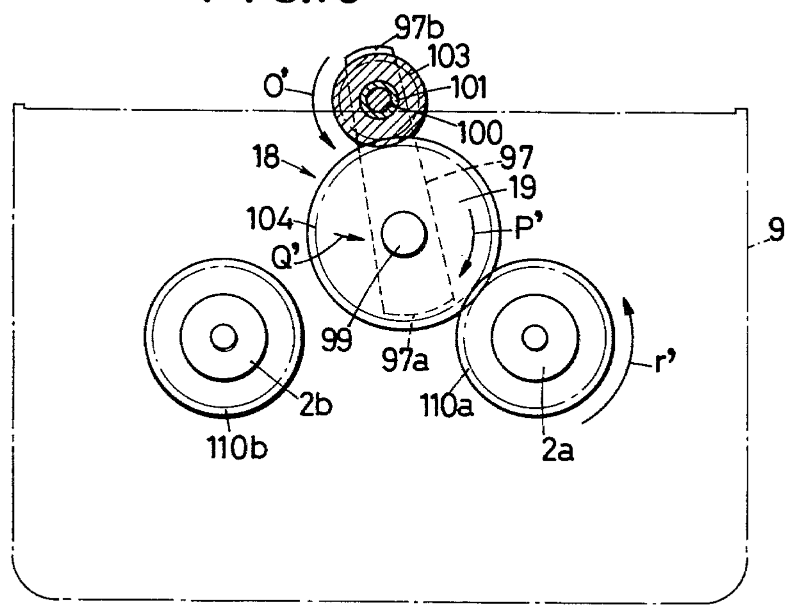

When the recorder is placed in the rewind mode electric motor 15 rotates in the opposite or reverse direction. As shown in FIG. 16 drive gear 103 is driven in the direction indicated by arrow o' and idler 19 is rotated in the direction indicated by arrow p'. At this time swing plate 97 swings in the direction indicated by arrow q', idler 19 engages with gear 110a formed on the periphery of supply reel mount 2a. As a result supply reel mount 2a rotates at a high speed in the direction indicated by arrow r' to transport magnetic tape 12 in a reverse or rewind direction at high speed.

Figure 13:
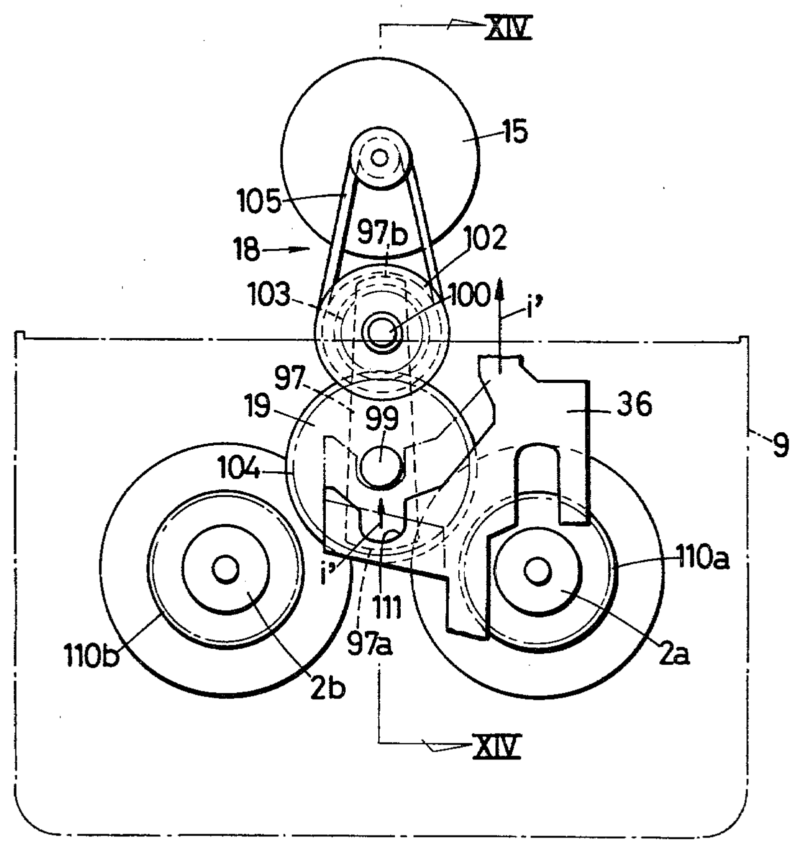
FIG. 13 is a plan view of a fast-forwarding/rewind change-over mechanism in the tape recorder shown in FIG. 1.
Figure 14:
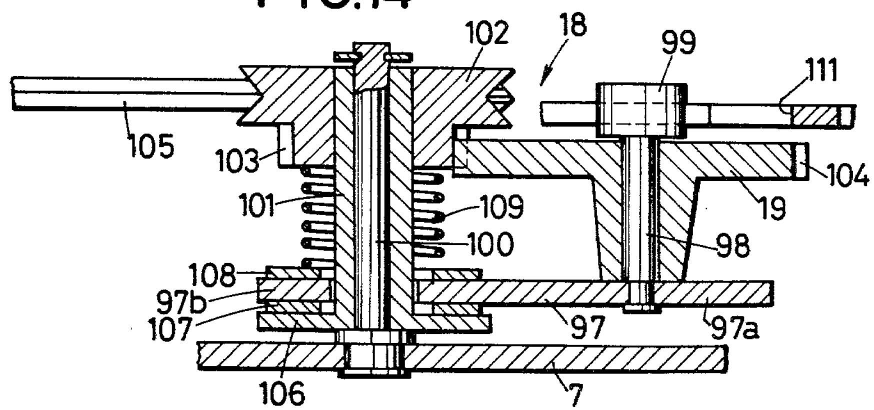
FIG. 14 is an enlarged cross-sectional view taken along line XIV—XIV of FIG. 13.

While the recorder is in either the reproduce or record modes, head chassis slide plate 36 is in the forward position shown in FIG. 13 and roller 99 mounted on the upper end of idler shaft 98 is held within a recess 111 formed in head chassis slide plate 36. Accordingly, idler 19 is held at an intermediate disengaged position between reel mounts 2a and 2b. Thus, idler 19 is prevented from inadvertently becoming engaged with either of the reel mounts 2a and 2b.

Figure 17:
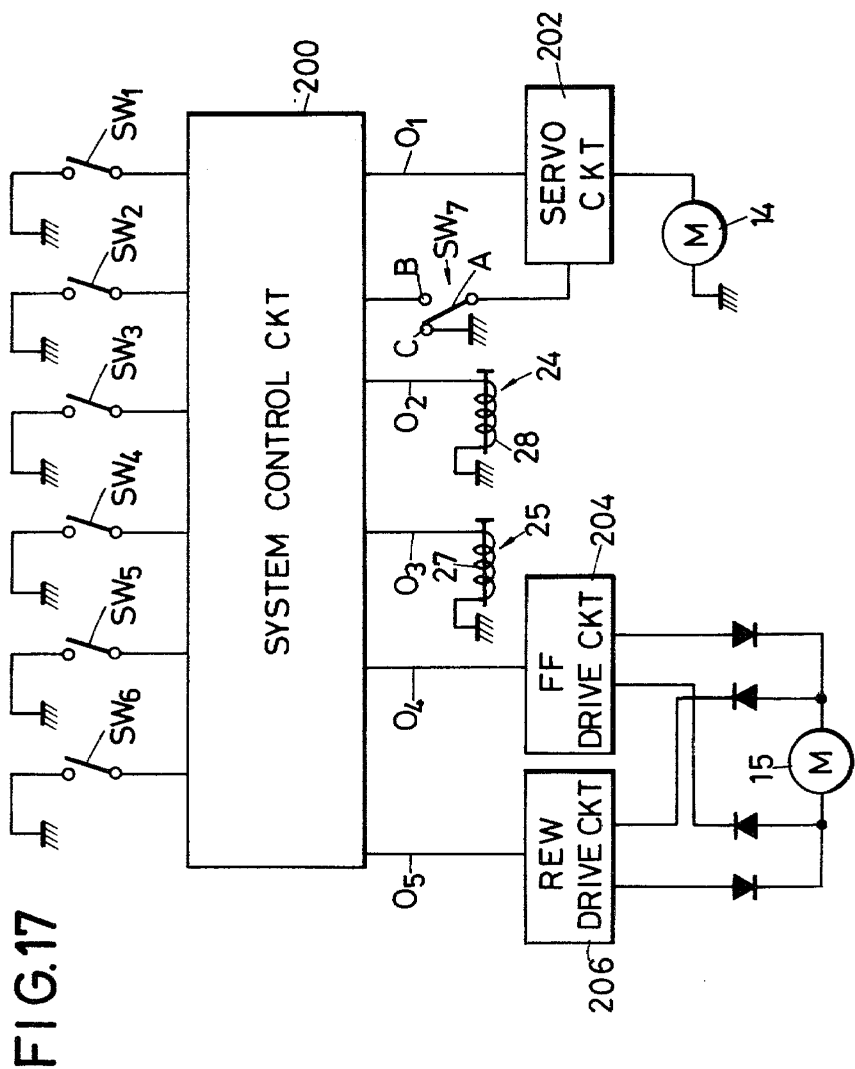
FIG. 17 is a drive circuit diagram of the tape recorder shown in FIG. 1.

Reference is now made to FIG. 17 for a description of the drive circuit for the above described small-sized tape recorder.

As shown in FIG. 17, when reproduce button switch $SW_1$ is closed for example when feather-touch record button is pressed, control signals are generated from output terminals $O_1$ and $O_2$ of a system control circuit 200 to drive electric motor 14 and energized plunger-solenoid 24 to change the tape recorder into the reproduce mode.

When record button switch $SW_2$ is closed control signals are generated from output terminals $O_1$, $O_2$ and $O_3$ of system control circuit 200 to drive electric motor 14 and to energize simultaneously plunger-solenoids 24 and 25 to change the tape recorder into the record mode.

When fast-forward button switch $SW_3$ is closed a control signal is generated from output terminal $O_4$ of system control circuit 200 to drive electric motor 15 in the forward direction through a fast-forward drive circuit 204. When rewind push button $SW_4$ is closed a control signal is generated from output terminal $O_5$ of system control circuit 200 to drive electric motor 15 in the reverse direction through a rewind drive circuit 206.

When stop button switch $SW_5$ is closed all of the control signals are cut off from output terminals $O_1$ to $O_5$ of the system control circuit 200 to deenergize the recorder.

A pause button switch $SW_6$ is also provided of the so-called "push-push" type. When pausebutton switch $SW_6$ is closed with the recorder is either the reproduce or record mode the control signal from the output terminal $O_1$ of the of the system control circuit 200 is cut off to stop electric motor 14. However, plunger-solenoid 24 remains energized in the reproduce mode and both plunger-solenoids 24 and 25 remain energized in the record mode.

Figure 8:
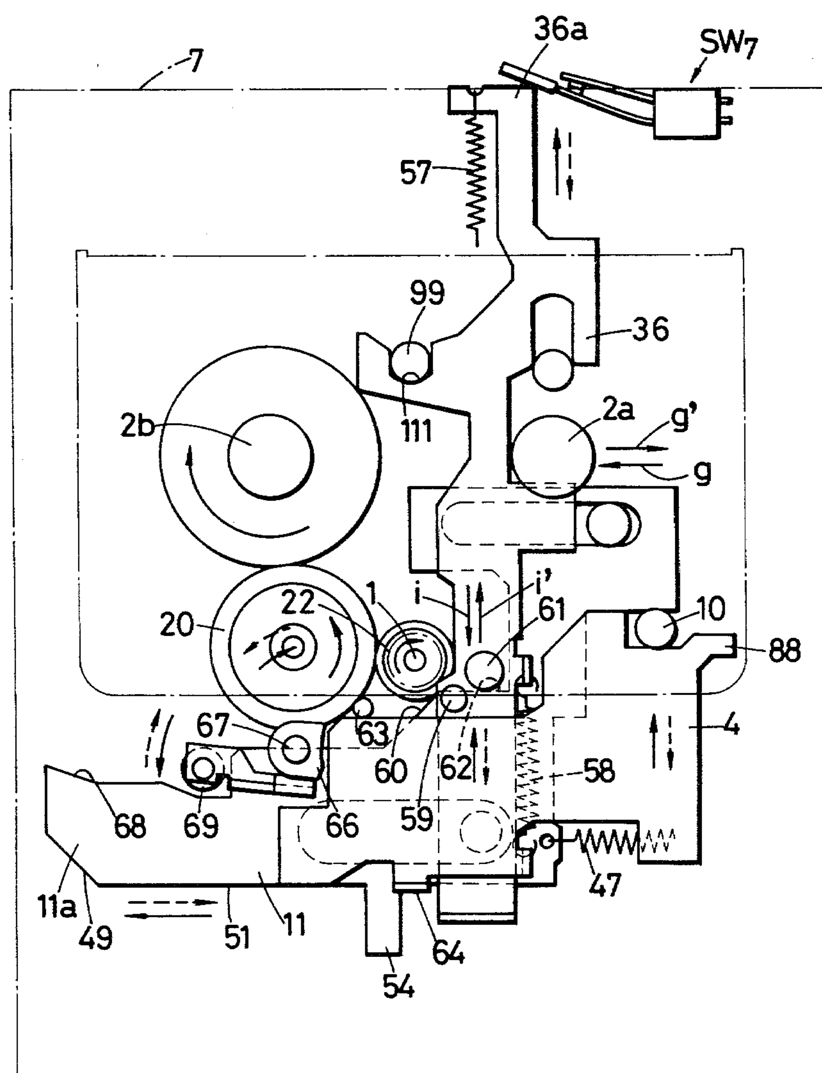
Figure 9:
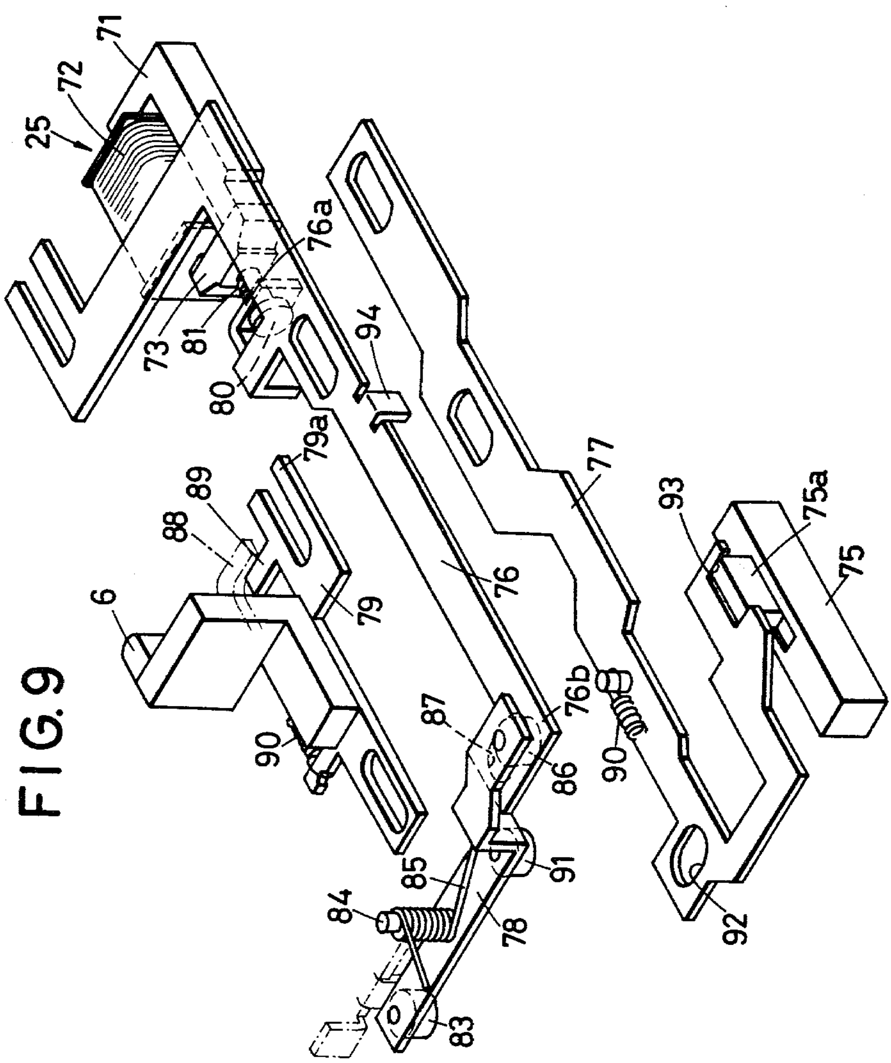
FIG. 9 is an exploded perspective view of a record change-over mechanism in the tape recorder shown in FIG. 1.

In addition to pause button switch $SW_6$, a pause system is also used in the small-sized tape recorder. This system includes a pause change-over switch $SW_7$, as shown in FIGS. 7 and 8. When head chassis assembly 4 is located at its original or inoperative position, as shown in FIG. 7, pause change-over switch $SW_7$ is opened. Immediately before head chassis assembly 4 reaches its forward or operative position, pause change-over switch $SW_7$ is closed. When pause change-over switch $SW_7$ is open electric motor 14 can be driven and when pause change-over switch $SW_7$ is closed electric motor 14 is stopped. Pause change-over switch $SW_7$ is actuated by the upper end 36a of head chassis slide plate 36, as shown in FIGS. 7 and 8. Referring again to FIG. 17, when pause change-over switch $SW_7$ is open as described above, the movable contact A is changed over to a first stationary contact B to enable servo circuit 202 to drive electric motor 14. When the pause change-over swtich $SW_7$ is closed, movable contact A is changed over to a second stationary contact C to connect servo circuit 202 to ground to stop electric motor 14.

With the change-over mechanism of this invention it is possible to edit signals in the magnetic tape. For example, when pause button switch $SW_6$ is closed with the recorder in the record mode with switch $SW_2$ closed, electric motor 14 is driven and the recorder is set in a record pause mode. Head chassis assembly 4 is moved forward and immediately before head chassis assembly 4 reaches its operative position pause change-over switch $SW_7$ is closed to stop electric motor 14. Thus, the setting of the tape recorder into the record pause mode ends. At that time the position of roller 69 mounted on the one end of pinch roller lever 66 is regulated by a linear portion 68' of setup slide 11 contiguous to the slanted cam portion 68 thereof. Accordingly, pinch roller 3 is not pressed against the capstan 1 but is slightly spaced apart from it.

When pause button switch $SW_6$ is opened in the abovedescribed condition, electric motor 14 is again driven and head chassis assembly 4 immediately moves into its operative position. At the instant pinch roller lever 66 is released from its position on linear portion 68' of setup slide 11 and pinch roller 3 is immediately pressed against capstan 1. Thus, the tape recorder is instantaneously changed from the pause mode into the record mode.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An operating mode change-over mechanism for use in a tape recording and/or reproducing apparatus comprising:

at least one plunger-solenoid having a stationary iron core and a movable iron core.

said movable iron core movable from a first position in contact with said stationary iron core to a second position spaced from said stationary iron core, a drive motor, a pinion driven by said drive motor, a rack member movable from a first position in engagement with said pinion to a second position disengaged from said rack, operating mode change-over means driven by said rack from a first inoperative position to a second mode change initiating position when said rack is in said first position, locking means driven by said movable iron core to hold said rack in said first position when said movable iron core is in its said first position, and spring means to urge said movable iron core into its said first position against said stationary iron core whereby while said movable iron core is in its said first position said plunger-solenoid is energized and said drive motor is driven.

2. An operating mode change-over mechanism according to claim 1 wherein said rack is locked in its first position by said locking means.

3. An operating mode change-over mechanism according to claim 2 wherein said rack is released from said locking means upon deenergizing of said plunger-solenoid whereby said rack moves to its said second position and said operating mode change-over means is moved from its second position back to its first position.

4. An operating mode change-over mechanism according to claim 3 wherein said mechanism further includes urging means for overcoming the spring force of said spring means to urge said movable iron core into its said second position upon movement of said rack from its first position to its second position and to return said movable iron core to its first position when said rack is moved back to its first position by deenergizing said plunger-solenoid whereupon said urging means moves to return said movable iron core to its said first position.

5. An operating mode change-over mechanism according to claim 1 wherein said mechanism further includes: a second plunger-solenoid having a stationary iron core and a movable iron core being movable from a first position in contact with and a second position spaced from said stationary iron core, a pivotable lever member urged by a spring member adapted to be contacted at one end by a head chassis assembly movable from a first rearward position to a second forward position, said lever being pivoted by said spring upon movement of said head chassis assembly to its second position, a slide member connected to the other end of said lever so as to be movable between first and second positions upon pivoting movement of said lever, said slide member being connected to said movable iron core.

6. An operating mode change-over mechanism according to claim 5 further including an erase head mount member mounting an erase head and movable from a first retracted position to a second position in operative contact with tape in said recorder, said movable erase head mounting member being urged to its said second position upon selection of a record mode for said tape recording and/or reproducing apparatus and wherein in a change-over into the reproduce mode for said recording and/or reproducing apparatus said head chassis assembly is moved to its second position in the deenergizing condition of said second plunger-solenoid, to move said slide member to its said second position through said lever, and to hold said erase head mounting member at its second position through said slide member, and in the change-over into the record mode, said second plunger-solenoid is energized with its said movable iron core in its said first position thereby to hold said slide member at its second position and wherein said erase head mounting member is moved to its second position with the movement of said head chassis assembly to its said second position to place said erase head into contact with said tape.

7. An operating mode change-over mechanism according to claim 6, in which said mechanism further includes change-over means for operatively changing over a record/reproduce switch connected to the said other end of said lever wherein said switch is moved back and forth upon movement of said lever.

8. An operating mode change-over mechanism according to claim 1 wherein said mechanism further includes a second bidirectional drive motor, a swing plate swingable in accordance with the rotational directions of said second motor and an idler mounted on said swing plate and being rotated in a forward or reverse tape drive direction with second motor and being selectively engageable with a supply reel mount or a take-up reel mount in said tape recording and/or reproducing apparatus.

9. An operating mode change-over mechanism for use in a tape recording and/or reproducing apparatus comprising:

electro-magnetic means having a stationary iron core, a drive source, a pinion driven by said drive source, a rack driven by said pinion and movable between a first retracted inoperative position and a second engaged operative position, urging means for urging said rack a movable core connected with said urging means, a first biasing means for biasing said movable core to engage with said stationary core locking means for locking said rack at said operative position, and circuit means for operating said electro-magnetic means.

10. An operating mode change-over mechanism according to claim 9 further comprising retracting means for retracting said first biasing means when said rack is in said operative position.

11. An operating mode change-over mechanism according to claim 10 wherein said retracting means is moved by said rack.

12. An operating mode change-over mechanism according to claim 11 wherein said circuit means further includes means for making said electro-magnetic means inoperative thereby resetting said rack to its said inoperative position.

13. An operating mode change-over apparatus according to claim 9 wherein said urging means and said locking means are provided by a lever having a locking portion for locking said rack and an engaging portion for urging said rack to engage with said pinion.

14. An operating mode change-over mechanism according to claim 12 further comprising second biasing means having a biasing force less than the biasing force of said first biasing means for biasing said movable core to disengage from said stationary core.

* * * * *